United States Patent Office 3,235,585
Patented Feb. 15, 1966

3,235,585
SEPARATION OF INDENEDI(BETA) AND INDENETRI(BETA) PROPIONIC ACIDS
Hans Dressler, Pitcairn, Pa., assignor to Koppers Company, Inc., a corporation of Delaware
No Drawing. Filed May 28, 1962, Ser. No. 197,843
6 Claims. (Cl. 260—515)

This invention relates to the production of polybasic organic acids containing an indene nucleus. In one specific aspect, it relates to the concurrent production of 1,1,3-indenetri(beta)propionic acid and 1,1-indenedi-(beta)propionic acid, both in essentially pure form and in high total yield, from a crude mixture of these acids.

The preparation of 1,1,3-indentri(beta)propionic acid from pure indene is not new. Herman A. Bruson, in U.S. Patent 2,339,218, described the preparation of the tricarboxylic acid from purified cyanoethylated indene by the alkaline hydrolysis of the cyanoethylated indene followed by acidification of the reaction mixture, separation of the product and multiple recrystallization from hot water. I have discovered a novel process which provides not only 1,1,3-indenetri(beta)propionic acid, but, unexpectedly, the heretofore unknown 1,1-indenedi(beta)propionic acid from the polycyanoethylated indene. Using my new process, both acids are obtained in essentially pure form and in high total yield.

The simple esters of the acids provided by the process of the invention have, inter alia, exceptional utility as plasticizers and softeners for thermoplastic resins, e.g., vinyl and cellulosic resins. Particularly useful for this purpose are those esters wherein the alkyl radical of the ester group has from 6–13 carbon atoms. The esters, when combined with a resin in an amount ranging between 10 and 100% by weight, have an exceptional degree of permanence comparable to commercial plasticizers, good low temperature performance and remarkable stability to both heat and light. The carboxylic acids obtained by the method of the invention are also useful as intermediates in the preparation of polyamides, polyesters and curing agents for epoxy resins.

It is, therefore, an object of the present invention to provide a method for the concurrent production of 1,1,3-indenetri(beta)propionic acid and 1,1-indenedi(beta)propionic acid in pure form and in good yield. It is a further object to provide the novel and useful 1,1-indenedi-(beta)propionic acid and a method for its preparation.

In accordance with the invention, polycyanoethylated indene is hydrolyzed in alkaline medium. The crude mixed acids thus formed are precipitated in the presence of chlorinated hydrocarbon by lowering the pH of the reaction mixture to less than about 3 by the addition of a mineral acid. The mixed acids are separated from the reaction mixture to less than about 3 by the addition of either a lower aliphatic ketone or a chloro lower alkane. The resulting slurry or solution is cooled and the insoluble 1,1,3-indenetri(beta)propionic acid is separated from the mixture. The filtrate is then evaporated to dryness and the residue is dissolved in aqueous caustic. The pH of the resulting solution is reduced to 4.5–5.5 to precipitate 1,1-indenedi(beta)propionic acid and the dicarboxylic acid is recovered by conventional means. The product acids have the formulae:

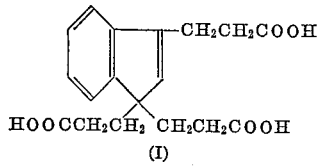
(I)

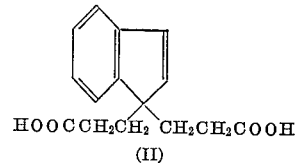
HOOCCH₂CH₂ CH₂CH₂COOH
(II)

The poly(beta)cyanoethyl indene useful as a starting material in the method of the invention is a mixture of a major portion (70–80% by weight) of tri(beta)cyanoethyl indene and a minor portion (20–30% by weight) of di(beta)cyanoethyl indene. The mixture is conveniently made either by the cyanoethylation of pure indene as described by Bruson in U.S. 2,280,058, or by the novel selective cyanoethylation of crude coal tar distillates, such as solent naphtha, described and claimed in the co-pending application S.N. 197,878, filed May 28, 1962, now Patent No. 3,179,693 of Hans Dressler and John O'Brochta.

The poly(beta)cyanoethylated indene is converted to a crude mixture of 1,1,3-indenetri(beta)propionic acid and 1,1-indenedi(beta)propionic acid by hydrolysis in alkaline medium. Conveniently, this is accomplished by refluxing the poly(beta)cyanoethylated indene in an aqueous solution of sodium or potassium hydroxide having a pH of at least 12. Suitable solutions contain about 5–25% by weight alkali metal hydroxide. The alkali metal hydroxide should be present in an amount at least equal to the theoretical requirement based on the number of cyano groups of the starting poly(beta)cyanoethylated indene. The presence in the solution of the alkali metal hydroxide in an amount of at least about 10% in excess of the theoretical requirement is helpful.

During the hydrolysis step it is generally beneficial to increase the mutual solubility of the alkali metal hydroxide and the polycyanoethylated indene by adding a small amount of a lower alkanol, such as methanol or ethanol. Alternatively, the hydrolysis can be performed in alcoholic media.

The crude mixed acids are precipitated from the solution by adding to the reaction mixture a dilute (5–25% by weight) aqueous solution of a mineral acid, such as sulfuric acid, hydrochloric acid or phosphoric acid, in an amount sufficient to lower the pH to at least about 3 and preferably to about 2. It is necessary to lower the pH to at least about 3 in order to precipitate all of the crude acids from the reaction mixture.

In order to obtain the crude mixed acids in an easily filterable form, precipitation must be performed in the presence of 100 to 500 weight percent of a chlorinated hydrocarbon. Useful chlorinated hydrocarbons include chloro lower alkenes, such as trichloroethylene; and chloro aromatics, such as 1,2,4-trichlorobenzene, dichlorobenzene, and the like.

The crude mixed acids are separated from the reaction mixture by conventional means, such as filtration or centrifugation. The acids are thereafter dissolved, slurried, or extracted with either a lower aliphatic ketone or a chloro lower alkane. Useful ketones include methyl ethyl ketone, methyl isobutyl ketone, acetone, diisopropyl ketone, acetophenone, and the like. The useful chloro lower alkanes include ethylenedichloride, chloroform, trichloroethane, and the like.

In order to separate the crude mixed acids, at least an equivalent weight of solvent, based on the weight of acids present, should be provided. The solvent is conveniently used in an amount up to above five equivalents of solvent per equivalent of acid. The use of additional solvent is not harmful, although the presence of a large excess of solvent complicates the recovery problems.

The mixed carboxylic acids are either slurried with the solvent at ambient temperatures or dissolved in the solvent by heating a slurry of acids and solvent to an elevated temperature, preferably to the reflux temperature. By cooling the resulting slurry or solution to a temperature ranging between about 0 and 25° C., substantially pure 1,1,3-indenetri(beta)-propionic acid is precipitated therefrom and the dicarboxylic acid remains in solution. The product tricarboxylic acid is separated by conventional means, such as filtration or centrifugation.

After the tricarboxylic acid has been removed, the remaining solution is evaporated to dryness and the residue is dissolved in an aqueous alkaline medium, such as aqueous sodium or potassium hydroxide. The pH of the resulting solution is adjusted to 4.5–5.5 by the addition of a dilute (5–25% by weight) aqueous solution of a mineral acid, such as sulfuric acid or hydrochloric acid, whereupon the 1,1-indenedi(beta)propionic acid precipitates from the solution. The pH of the solution during the precipitation is critical. Above pH 5.5 only slight turbidity occurs, indicating insufficient precipitation of the desired dicarboxylic acid. Below pH 4.5 the solution precipitates an oily intractable mass and the separation of the desired product is not possible. After the precipitation of the product dicarboxylic acid, it is separated by filtration or centrifugation.

By the method of the invention, there is obtained a 63–75% yield of colorless 1,1,3-indenetri(beta)propionic acid, M.P. 167–169° C., 99% pure by neutralization equivalent, and a 13–17% yield of colorless indenedi(beta)propionic acid, M.P. 154–155° C., 99% pure by neutralization equivalent. The yield of the concurrently produced acids is 76–92% of the theoretical, based upon the starting crude polycyanoethylated indene.

My invention is further illustrated by the following examples:

Example I

To a stirred mixture of 357 grams (3.0 moles) of 97% indene, 450 ml. of benzene, and 6.0 grams (0.054 mole) of potassium t-butoxide there was added 477 grams (9.0 moles) of acrylonitrile dropwise at 50–60° C. during three hours. The mix was stirred at 50–60° C. for an additional two hours, then treated with 3.0 ml. of glacial acetic acid and 30 grams of activated carbon and filtered. The filtrate was devolatilized to 155° C. (pot)/20 mm. to give 790 grams (222 wt. percent yield, based on indene) of poly(beta-cyanoethyl)indene (found: 14.3% N), an amber semi-solid.

A mixture of 361 grams of the above poly(beta-cyanoethyl)indene, 209 grams of sodium hydroxide, and 1154 grams of water was stirred and refluxed until the evolution of ammonia ceased (22–30 hours). The slightly turbid solution was then brought to pH 6 with dilute sulfuric acid, treated with activated carbon, and filtered. To the stirred filtrate there was added 500 ml. of trichloroethylene (to prevent precipitation of the product carboxylic acids as an oil which solidifies to a lumpy, intractable solid) and the mix was brought to pH 2 with dilute sulfuric acid, cooled to 15–20° C., and filtered. The cake was pressed dry, washed with 100 ml. of water, and dried to give 429 grams [100% yield, calcd. on an assumed 75% tri(beta - cyanoethyl)idene-25% di(beta - cyanoethyl)indene composition for the starting material] of a tan solid, M.P. 117–147° C., i.e., crude poly(beta-carboxyethyl)indene.

A slurry of 200 grams of this carboxylic acid mixture and 300 ml. of methyl ethyl ketone was stirred and refluxed for 0.5 hour, then cooled to 20° C. and filtered. The cake was pressed dry, washed with 100 ml. of cold methyl ethyl ketone, and dried to give 137 grams (68.5% yield) of a colorless solid, M.P. 167–169° C., which was 99 mole percent pure 1,1,3-indenetri(beta)propionic acid by its neutralization equivalent.

*Analysis.*—Calcd. for $C_{18}H_{20}O_6$: Neutral. equiv., 111.6. Found: Neutral. equiv., 111.9.

The methyl ethyl ketone solution (filtrate) was evaporated to dryness to give 47.5 grams of tan solids, M.P. 126–145° C. A 30 gram portion of this residue was dissolved in 11 grams of sodium hydroxide and 100 ml. of water. The solution was treated with activated carbon, filtered, and the filtrate acidified with water, and dried to give 16.5 grams (13.1% yield) of a colorless solid, M.P. 154–155° C., 99.5% pure 1,1-indenedi(beta)propionic acid by its neutralization equivalent (structure proof by nuclear magnetic resonance spectrum).

*Analysis.*—Calcd. for $C_{15}H_{16}O_4$: Neutral. equiv., 130.0. Found: Neutral. equiv., 130.6.

Example II

A mixture of 50 grams of the indene poly(beta)propionic acids obtained as described in Example I hereabove and 15 ml. of chloroform was stirred and refluxed for 0.5 hour, then stirred at 25° C. for 0.5 hour, and finally filtered. The cake was washed with 25 ml. of cold chloroform and dried to give 31.4 grams (63% yield) of almost colorless 1,1,3-indenetri(beta)propionic acid, M.P. 162–166° C. 1,1-indenedi(beta)propionic acid was recovered from the filtrate as described in Example I.

Example III

A mixture of 50 grams of the indene poly(beta)propionic acids obtained as described in Example I hereabove and 150 ml. of methyl isobutyl ketone was slurried at 25° C. for 1.0 hour, and finally filtered. The cake was washed with 25 ml. of cold methyl isobutyl ketone and dried to give 31.0 grams (62% yield) of almost colorless 1,1,3-indenetripropionic acid, M.P. 162–166° C. 1,1-indenedi(beta)propionic acid was recovered from the filtrate as described in Example I.

Example IV

A mixture of 680 grams of the crude mixed acids obtained as described in Example I and 1350 ml. of methyl ethyl ketone was stirred and refluxed for 0.5 hour, then stirred at 20° C. for one hour and finally filtered. The cake was washed with three 100 ml. portions of methyl ethyl ketone, air-dried, then dried at 80° C./28-in. Hg for five hours to give 456 grams (67% yield; 89.4% recovery based on the starting material which contained ca. 75% tricarboxylic acid) of a very light tan 1,1,3-indenetri(beta)propionic acid, M.P. 167–169° C. Found: Neutral. equiv., 113.7 (calcd. Neutral. equiv. 110.3). The combined filtrates were evaporated to dryness. The residue was taken up in a solution of 60 g. of sodium hydroxide in 500 ml. of water, boiled for ten minutes with 5 grams of activated charcoal, and filtered. The clear, dark filtrate was brought to pH 5.0 with 20% surfuric acid, stirred and cooled to 20° C. and filtered. The cake was washed with three 100 ml. portions of water and dried for five hours at 70° C./28-inch Hg to give 105.5 g. (15.5% yield; 62% recovery based on the starting material which contained ca. 25% of dicarboxylic acid) of almost colorless 1,1-indenedi(beta)propionic acid, M.P. 150–152° C. Found: Neutral. equiv. 131.0 (calcd. Neutral. equiv. 130.0).

Example V

The procedure of Example IV was substantially repeated with the exception that the filtrate obtained after the recovery of the tri-acid was brought to pH 4 with sulfuric acid. The solution turned to an oily mass from which the desired product could not be separated.

I claim:

1. Method of making 1,1,3-indenetri(beta)propionic acid and 1,1-indenedi(beta)propionic acid, comprising hydrolyzing poly(beta)cyanoethylated indene in an alkaline medium, precipitating the crude mixed acids thus formed by lowering the pH of the reaction mixture to less than 3 by the addition of a mineral acid, separating the crude mixed acids from the reaction mixture, mixing the crude mixed acids in 1–5 equivalents of a solvent selected from the group consisting of lower aliphatic ketones and chloro lower alkanes, cooling the mixture to precipitate 1,1,3-indenetri(beta)propionic acid, separating the tricarboxylic acid from the solution, evaporating the solution to dryness, dissolving the residue in aqueous caustic, reducing the pH of the resulting solution to pH 4.5–5.5 to precipitate 1,1-indenedi(beta)propionic acid and separating the dicarboxylic acid from the solution.

2. Method of making 1,1,3-indenetri(beta)propionic acid and 1,1-indenedi(beta)propionic acid, comprising hydrolyzing poly(beta)cyanoethylated indene in an aqueous alkaline medium, precipitating the crude mixed acids thus formed in the presence of a liquid chlorinated hydrocarbon by lowering the pH of the reaction mixture to less than 3 by the addition of a mineral acid, separating the mixed acids from the reaction mixture, dissolving the crude mixed acids in 1–5 equivalents of a solvent selected from the group consisting of lower aliphatic ketones and chloro lower alkanes, cooling the solution to precipitate 1,1,3-indenetri(beta)propionic acid, separating the tricarboxylic acid from the solution, evaporating the solution to dryness, dissolving the residue in aqueous caustic, reducing the pH of the resulting solution to pH 4.5–5.5 to precipitate 1,1-indenedi(beta)propionic acid and separating the dicarboxylic acid from the solution.

3. Method according to claim 2 wherein said solvent is a lower aliphatic ketone.

4. Method of making 1,1,3-indenetri(beta)propionic acid and 1,1-indenedi(beta)propionic acid, comprising hydrolyzing poly(beta)cyanoethylated indene in an aqueous alkaline medium having a pH of at least about 12, precipitating the crude mixed acids thus formed in the presence of trichloroethylene by lowering the pH of the reaction mixture to less than 3 by the addition of sulfuric acid, separating the mixed acids from the reaction mixture, dissolving the crude mixed acids in 1–5 equivalents of methyl ethyl ketone, cooling the solution to precipitate 1,1,3-indenetri(beta)propionic acid, separating the tricarboxylic acid from the solution, evaporating the solution to dryness, dissolving the residue in aqueous caustic, reducing the pH of the resulting solution to pH 4.5–5.5 by the addition of sulfuric acid to precipitate 1,1-indenedi(beta)propionic acid and separating the dicarboxylic acid from the solution.

5. In the separation of a crude mixture of 1,1,3-indenetri(beta)propionic acid and 1,1-indenedi(beta)propionic acid made by the alkaline hydrolysis of polycyanoethylated indene, followed by the precipitation of the crude mixed acids thus formed in the presence of a liquid chlorinated hydrocarbon by lowering the pH of the reaction mixture to less than 3 by the addition of a mineral acid and the separation of the mixed acids from the reaction mixture, the improvement comprising dissolving the crude mixed acids in 1–5 equivalents of a solvent selected from the group consisting of lower aliphatic ketones and chloro lower alkanes by heating to an elevated temperature up to the reflux temperature, cooling the resulting solution to precipitate 1,1,3-indenetri(beta)propionic acid, separating the tricarboxylic acid from the solution, evaporating the solution to dryness, dissolving the residue in aqueous caustic, reducing the pH of the resulting solution to pH 4.5–5.5 to precipitate 1,1-indenedi(beta)propionic acid and separating the dicarboxylic acid from the solution.

6. In the separation of a crude mixture of 1,1,3-indenetri(beta)propionic acid and 1,1-indenedi(beta)propionic acid made by the alkaline hydrolysis of polycyanoethylated indene, followed by the precipitation of the crude mixed acids thus formed in the presence of a liquid chlorinated hydrocarbon by lowering the pH of the reaction mixture to les than 3 by the addition of a mineral acid and the separation of the mixed acids from the reaction mixture to less than 3 by the addition of a mineral crude mixed acids in 1–5 equivalents of a solvent selected from the group consisting of lower aliphatic ketones and chloro lower alkanes, cooling the resulting mixture to precipitate 1,1,3-indenetri(beta)propionic acid, separating the tricarboxylic acid from the solution, evaporating the solution to dryness, dissolving the residue in aqueous caustic, reducing the pH of the resulting solution to pH 4.5–5.5 to precipitate 1,1-indenedi(beta)propionic acid and separating the dicarboxylic acid from the solution.

References Cited by the Examiner
UNITED STATES PATENTS

| | | | |
|---|---|---|---|
| 1,822,016 | 9/1931 | Daniels | 260—525 |
| 1,945,246 | 1/1934 | Witzel | 260—525 |
| 2,280,058 | 4/1942 | Bruson | 260—515 X |
| 2,339,218 | 1/1944 | Bruson | 260—515 |
| 2,556,228 | 6/1951 | Souders | 260—525 X |

OTHER REFERENCES

Bruson, "J. Am. Chem. Soc.," vol. 64, pp. 2457–2461 (1942).

LORRAINE A. WEINBERGER, *Primary Examiner.*

LEON ZITVER, *Examiner.*